(12) United States Patent
Yamada

(10) Patent No.: US 8,138,712 B2
(45) Date of Patent: Mar. 20, 2012

(54) MOTOR DRIVE SYSTEM AND ITS CONTROL METHOD

(75) Inventor: Kenji Yamada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 296 days.

(21) Appl. No.: 12/451,671

(22) PCT Filed: Jun. 12, 2008

(86) PCT No.: PCT/JP2008/061187
§ 371 (c)(1),
(2), (4) Date: Nov. 24, 2009

(87) PCT Pub. No.: WO2009/001738
PCT Pub. Date: Dec. 31, 2008

(65) Prior Publication Data
US 2010/0164416 A1 Jul. 1, 2010

(30) Foreign Application Priority Data
Jun. 26, 2007 (JP) ................................. 2007-167832

(51) Int. Cl.
*H02P 6/00* (2006.01)
*H02P 21/00* (2006.01)
*H02P 7/00* (2006.01)
*H02P 27/00* (2006.01)
*H02P 27/04* (2006.01)

(52) U.S. Cl. .............. 318/807; 318/400.01; 318/400.02; 318/432; 318/434; 318/700; 318/798; 318/800; 318/801; 318/805; 318/811

(58) Field of Classification Search ............. 318/400.01, 318/400.02, 432, 434, 700, 798, 800, 801, 318/805, 807, 811
See application file for complete search history.

(56) References Cited

U.S. PATENT DOCUMENTS

| | | | | |
|---|---|---|---|---|
| 4,782,272 A | * | 11/1988 | Buckley et al. | 318/400.01 |
| 4,868,539 A | * | 9/1989 | Foord | 375/344 |
| 5,442,250 A | * | 8/1995 | Stridsberg | 310/186 |
| 5,780,986 A | * | 7/1998 | Shelton et al. | 318/432 |
| 6,154,379 A | * | 11/2000 | Okita | 363/40 |

(Continued)

FOREIGN PATENT DOCUMENTS

JP    A 60-261383    12/1985

(Continued)

OTHER PUBLICATIONS

International Search Report issued in International Application No. PCT/JP2008/061187; Mailed on Sep. 22, 2008.

(Continued)

*Primary Examiner* — Walter Benson
*Assistant Examiner* — Gabriel Agared
(74) *Attorney, Agent, or Firm* — Oliff & Berridge, PLC

(57) ABSTRACT

A ripple detection unit detects a ripple current width of a motor current controlled according to PWM control. A ripple reference setting unit sets a reference value of the ripple current width. A frequency adjusting unit sets a control signal indicating a carrier frequency of the PWM control according to a ripple current width deviation. A carrier generation unit generates a carrier of the frequency based on the control signal. Thus, it is possible to realize feedback control of the carrier frequency for maintaining the ripple current width at an appropriate level.

9 Claims, 6 Drawing Sheets

U.S. PATENT DOCUMENTS

| | | | |
|---|---|---|---|
| 6,426,602 B1 * | 7/2002 | McCann et al. | 318/432 |
| 6,559,616 B2 * | 5/2003 | Aoki et al. | 318/567 |
| 6,885,568 B2 * | 4/2005 | Kernahan et al. | 363/97 |
| 7,723,946 B2 * | 5/2010 | Welchko et al. | 318/811 |
| 2006/0139019 A1 * | 6/2006 | Chu et al. | 323/282 |
| 2008/0084716 A1 * | 4/2008 | Ganev et al. | 363/39 |

FOREIGN PATENT DOCUMENTS

| | | |
|---|---|---|
| JP | A-61-121798 | 6/1986 |
| JP | A-01-321868 | 12/1989 |
| JP | A-06-178550 | 6/1994 |
| JP | A-09-037560 | 2/1997 |
| JP | A-2001-186787 | 7/2001 |
| JP | A-2005-045848 | 2/2005 |
| JP | A-2006-211847 | 8/2006 |
| JP | A-2006-352951 | 12/2006 |

OTHER PUBLICATIONS

Apr. 5, 2011 Office Action issued in Japanese Patent Application No. 2007-167832, with translation.

* cited by examiner

MOTOR DRIVE SYSTEM AND ITS CONTROL METHOD

TECHNICAL FIELD

The present invention relates to a motor drive system and its control method and, more specifically, to a motor drive system including a power converter performing pulse width modulation (PWM) control and its control method.

BACKGROUND ART

In a power converter performing PWM control, a structure in which carrier frequency used for PWM control is variably controlled has been known. For instance, Japanese Patent Laying-Open No. 1-321868 (Patent Document 1) discloses a structure for a power converting device performing PWM control, including a series resonance circuit in parallel with a smoothing capacitor, in which carrier frequency for PWM control is variably changed such that resonance frequency of the series resonance circuit and frequency of ripple component included in a DC current of the power converting device inherent to PWM control are matched in a prescribed range.

Japanese Patent Laying-Open No. 6-178550 (Patent Document 2) discloses, as a VVVF inverter current control device, a structure for automatically performing carrier frequency modulation through feedback control such that in accordance with an absolute value of current ripple defined by a deviation between current instruction value of each phase and an actual current value of each phase, the carrier frequency is increased when current ripple is large and decreased when it is small.

Further, Japanese Patent Laying-Open No. 9-37560 (Patent Document 3) discloses an inverter controller capable of reducing current ripple entering the system, in which carrier frequency is variably controlled in accordance with an output of a system voltage detecting means detecting magnitude of system voltage of each phase.

Further, Japanese Patent Laying-Open No. 2006-352951 (Patent Document 4) discloses a control structure for a power converter using first and second inverters, in which phase difference between carrier signals used in respective inverters is controlled, so that ripple current can be reduced as much as possible even when carrier frequency is changed in one of or both of the inverters.

Further, Japanese Patent Laying-Open No. 2005-45848 (Patent Document 5) discloses an AC electric motor controller having a control structure in which, if a difference width between PWM pulses of two phases of a three-phase PWM inverter is equal to or smaller than a prescribed value, or if an output voltage of the three-phase PWM inverter is low, making detection of motor current difficult, the carrier frequency of PWM inverter is automatically reduced to enable current detection.

DISCLOSURE OF THE INVENTION

As described in Patent Documents 1 to 5, in a power converter performing PWM control, in a current supplied from the power converter to a load, a high-frequency component (ripple current) generates, which has the carrier frequency or an integer multiple of the carrier frequency.

If the ripple current as such increases, in a motor drive system driving a permanent magnet type AC electric motor, an eddy current in the magnet generated by magnetic flux variation increases. When heat generation by the eddy current increases as a result and magnet temperature increases to such a level that causes demagnetization, motor output could possibly decrease. Further, because of increased copper loss/iron loss of the motor, power loss increases. When power loss increases, heat generation in the motor increases and, therefore, magnet temperature tends to further increase.

In a power converter performing PWM control, it is possible to reduce ripple current by increasing carrier frequency of PWM control. When the carrier frequency is increased, however, switching frequency of a semiconductor switching element constituting the power converter, that is, the number of on/off of switching element in the same time period, increases. This leads to a problem that power loss increases because of switching loss in the power converter.

As described above, in the power converter performing PWM control, if the ripple current is too large, problem arises in the AC electric motor, while curbing the ripple current too much is not preferable from the view point of switching loss.

In regard of such problems, Patent Documents 1 and 3 control carrier frequency focusing only on the reduction of ripple current. In the PWM power converter according to Patent Document 1, it is necessary to additionally arrange a series resonance circuit and, therefore, cost increases because of increased number of components.

Further, in the VVVF inverter current controller disclosed in Patent Document 2, execution of feedback control is disclosed in which, when the deviation from the current instruction value of each phase is large, carrier frequency is increased, and when the deviation is small, it is decreased. This reference, however, does not disclose adjustment of AC component (ripple current) magnitude in the current of each phase to an appropriate level.

In the power converter disclosed in Patent Document 4, it is possible to decrease as much as possible the ripple current when the carrier frequency is changed, by appropriately controlling phase difference of carrier signals between two inverters. This reference, however, does not disclose adjustment of ripple current magnitude to an appropriate level. Further, while the AC electric motor controller described in Patent Document 5 controls a permanent magnet synchronous motor, this reference does not disclose change of carrier frequency in accordance with the ripple current.

The present invention was made to solve the problems described above, and its object is, in a motor drive system supplying a motor current to an AC electric motor having a permanent magnet attached thereon, by a power converter controlled by PWM control, to prevent increase of switching loss in the power converter and to prevent occurrence of demagnetization caused by increase in magnet temperature in the AC electric motor, by maintaining the ripple current width of motor current at an appropriate level.

The present invention provides a motor drive system, including an AC electric motor having a rotor with a permanent magnet attached thereon, a power converter, a current detector, a ripple detecting unit, a reference setting unit and a frequency adjusting unit. The power converter controls power supply to the AC electric motor by on/off control of a plurality of power semiconductor switching elements under pulse width modulation control. The current detector detects a motor current flowing between the power converter and the AC electric motor. The ripple detecting unit detects a ripple current width of the motor current, corresponding to switching frequency of each of the power semiconductor switching elements, based on a detected value from the current detector. The reference setting unit sets a reference value of the ripple current width. The frequency adjusting unit controls frequency of a carrier used for the pulse width modulation control, based on a comparison between the ripple current width detected by the ripple detecting unit and the reference value set by the reference setting unit.

The present invention provides a motor drive system control method, for controlling a motor drive system including an AC electric motor having a rotor with a permanent magnet attached thereon, a power converter controlling power supply to the AC electric motor by on/off control of a plurality of power semiconductor switching elements under pulse width modulation control, and a current detector detecting a motor current flowing between the power converter and the AC electric motor, including: the step of detecting a ripple current width of the motor current, corresponding to switching frequency of the power semiconductor switching elements, based on a detected value from the current detector; and the step of controlling frequency of carrier used for the pulse width modulation control, based on a comparison between the detected ripple current width and a reference value of the ripple current width.

Preferably, the reference value of ripple current width is set such that magnet temperature does not increase to a temperature causing demagnetization of the permanent magnet, at least based on a temperature increase characteristic of the permanent magnet with respect to the ripple current width.

More preferably, the reference value of ripple current width is set further based on power loss characteristic of the motor drive system as a whole, with respect to the ripple current width.

According to the motor drive system and its control method described above, such a ripple current control becomes possible that the ripple current width in the motor current under PWM control is adjusted to match a reference value. Consequently, increase of switching loss in the power converter resulting from too much curbing of ripple current width can be prevented, and occurrence of demagnetization caused by increased magnet temperature in the AC electric motor resulting from excessive ripple current can also be prevented.

More preferably, the reference value of ripple current width is changed in accordance with a state of the AC electric motor.

By such an approach, it is possible to appropriately set the reference value of ripple current width based on the present state of AC electric motor (for example, motor temperature, motor torque/rotation speed). As a result, switching loss of the power converter and increase of magnet temperature in the AC electric motor can more effectively be prevented.

Preferably, the frequency adjusting unit increases the carrier frequency to be higher than the present frequency when the ripple current width is larger than the reference value and decreases the carrier frequency to be lower than the present frequency when the ripple current width is equal to or smaller than the reference value.

In this manner, the ripple current control in accordance with carrier frequency described above can be realized in a simple structure.

Preferably, the frequency adjusting unit includes a deviation calculating unit calculating a deviation of the ripple current width from the reference value, and a control operation unit. The control operation unit controls the carrier frequency in accordance with a control operation value using the calculated deviation.

In this manner, the amount of change in carrier frequency can be controlled in accordance with the deviation of ripple current width from the reference value and, therefore, speed of control in the ripple current control can be improved.

Preferably, in the motor drive system, on/off of the plurality of power semiconductor switching elements is controlled based on a comparison between a voltage command value of sinusoidal wave for controlling the motor current such that the motor current matches a current command value, based on the detected value from the current detector, and a voltage value of the carrier. By the ripple detecting unit or at the detecting step, the ripple current width is detected based on a difference between detected values from the current detector sampled respectively at two timings at which the voltage command value and the carrier intersect, in one period of the carrier.

By such an approach, the ripple current width can immediately be detected by two current sampling operations, without necessitating filtering of motor current. Therefore, control speed in the ripple current control described above can be improved.

Preferably, in the motor drive system, on/off of the plurality of power semiconductor switching elements is controlled based on a comparison between a voltage command value of sinusoidal wave for controlling the motor current such that the motor current matches a current command value, based on the detected value from the current detector sampled at every half period of the carrier, and a voltage value of the carrier. By the ripple detecting unit or at the detecting step, the ripple current width is detected based on a difference between detected values from the current detector sampled at one of timings at which the voltage command value and the carrier intersect, in one period of the carrier, and a detected value of the current detector sampled for the motor current control.

By such an approach, the ripple current width can be detected utilizing current sampling inherently required for current control. Therefore, the number of current samplings newly required for detecting the ripple current width can be reduced and, therefore, the ripple current control described above can be realized without increasing computational load.

Preferably, the motor drive system is mounted on a vehicle, and the AC electric motor is a three-phase synchronous motor adapted to generate driving power of the vehicle.

In this manner, in a motor drive system in which power supply to a three-phase synchronous motor formed to generate a vehicle driving power is controlled by a power converter (inverter) utilizing PWM control, it becomes possible to prevent increase in switching loss in the power converter and to prevent occurrence of demagnetization caused by increased magnet temperature in the motor. As a result, improved mileage can be attained by decreased power loss, while degradation in running performance resulting from the influence of demagnetization can be prevented.

Therefore, a main advantage of the present invention is that, in a motor drive system supplying motor current to an AC electric motor having a permanent magnet attached thereon by a power converter controlled by PWM control, increase in switching loss in the power converter can be prevented while occurrence of demagnetization resulting from increased magnet temperature in the AC electric motor can be prevented, by maintaining the ripple current width of motor current at an appropriate level.

BEST MODES FOR CARRYING OUT THE INVENTION

Figure 1:
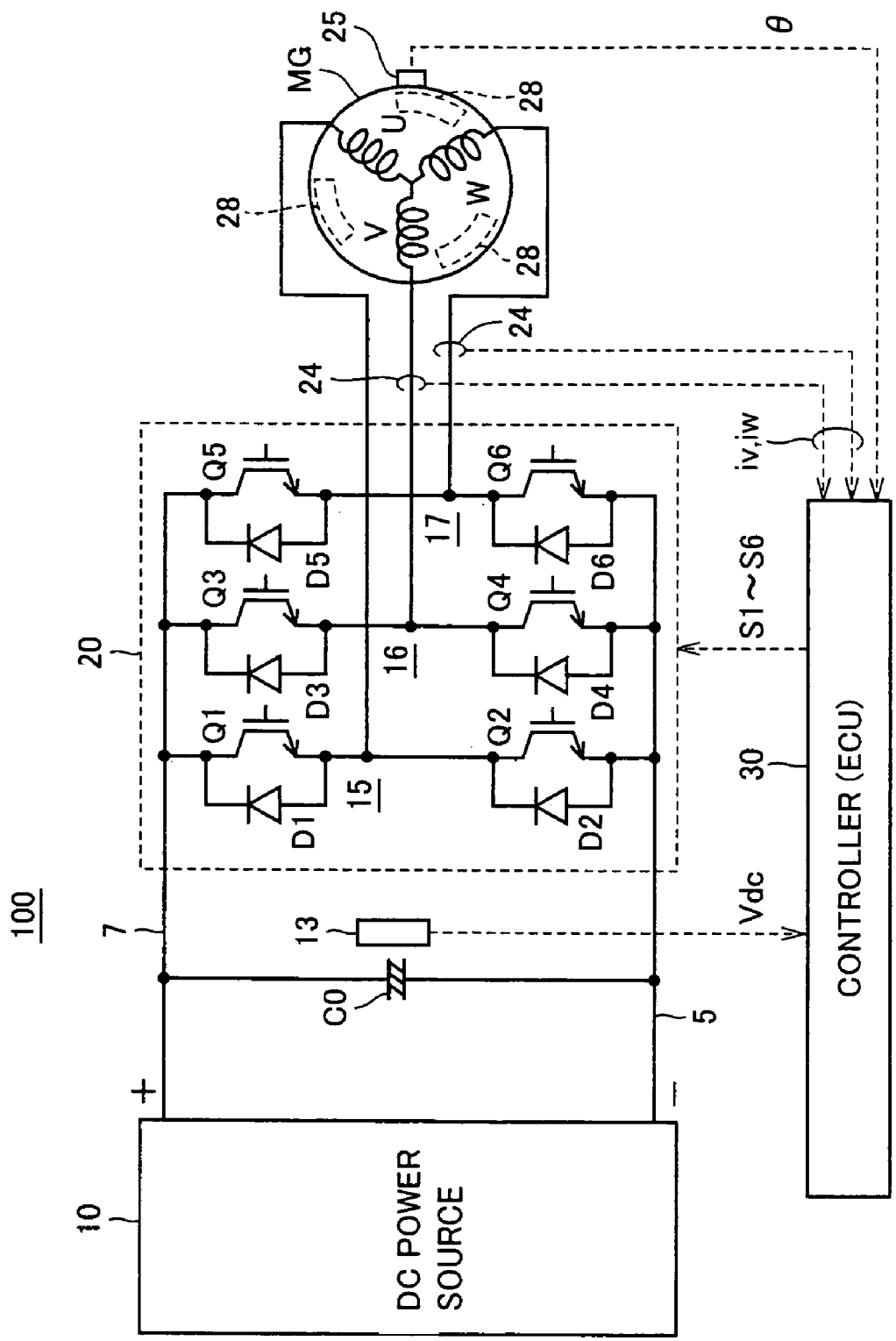
FIG. 1 shows an overall configuration of a motor drive system in accordance with an embodiment of the present invention.

In the following, embodiments of the present invention will be described in detail with reference to the figures. In the following, the same or corresponding portions in the figure are denoted by the same reference characters and basically, detailed description thereof will not be repeated.

(Overall System Configuration)

FIG. 1 shows an overall configuration of a motor drive system in accordance with an embodiment of the present invention.

Referring to FIG. 1, a motor drive system 100 in accordance with an embodiment of the present invention includes a DC power source 10, a voltage sensor 13, a smoothing capacitor C0, an inverter 20, a controller 30, and an AC electric motor MG as a load.

AC electric motor MG is a driving motor for generating torque to drive driving wheels of, for example, a hybrid vehicle or an electric vehicle. AC electric motor MG may be adapted to have a function of electric power generator driven by an engine, or it may be adapted to have both functions of motor and generator. Further, AC electric motor MG may be incorporated in a hybrid vehicle as an electric motor operating with respect to the engine, which can start engine operation.

DC power source 10 outputs a DC voltage between a power line 7 and a ground line 5. Further, DC power source 10 is chargeable with DC voltage between power line 7 and ground line 5. Typically, DC power source 10 is formed of an electric storage implemented by a secondary battery such as a nickel hydride battery, lithium ion battery or the like, or by an electric double layer capacitor. A converter may be provided to change voltage level of the output voltage (DC) of power storage device, so as to enable variable control of the output voltage of DC power source 10, that is, the voltage between power line 7 and ground line 5.

Smoothing capacitor C0 is connected between power line 7 and ground line 5. A voltage across terminals of smoothing capacitor C0 that corresponds to the DC side voltage of inverter 20 is detected by voltage sensor 13, and the detected value is transmitted to controller 30 formed by an electronic control unit (ECU).

Inverter 20 is formed of a U-phase circuit 15, a V-phase circuit 16 and a W-phase circuit 17 provided in parallel between power line 7 and ground line 5. Each phase circuit includes a power semiconductor switching element connected in series between power line 7 and ground line 5. As the power semiconductor switching element (hereinafter simply referred to as "semiconductor switching element"), typically, an IGBT (Insulated Gate Bipolar Transistor) is used.

U-phase circuit 15 includes a semiconductor switching element Q1 as an upper arm element and a semiconductor switching element Q2 as a lower arm element, V-phase circuit 16 includes a semiconductor switching element Q3 as an upper arm element and a semiconductor switching element Q4 as a lower arm element, and W-phase circuit 17 includes a semiconductor switching element Q5 as an upper arm element and a semiconductor switching element Q6 as a lower arm element. Further, to respective semiconductor switching elements Q1 to Q6, free-wheel diodes D1 to D6 to cause current flow in an opposite direction to respective semiconductor switching elements are connected. On/off of semiconductor switching elements Q1 to Q6 is controlled by switching control signals S1 to S6 from controller 30.

AC electric motor MG is a three-phase permanent magnet motor having a permanent magnet 28 attached to or embedded in a rotor, not shown. Specifically, three coils of U-, V- and W-phases of AC electric motor MG each have one end commonly connected to a neutral point, and coils of U-, V- and W-phases each have the other end connected to a connection node between the upper and lower arm elements of U-, V- and W-phases of inverter 20.

When a torque command value of AC electric motor MG is positive (Tqcom>0), inverter 20 drives AC electric motor MG such that the DC voltage from smoothing capacitor C0 is converted to AC voltage by switching operations of semiconductor switching elements Q1 to Q6 in response to switching control signals S1 to S6 from controller 30 and thereby a positive torque is output. Further, when the torque command value of AC electric motor MG is 0 (Tqcom=0), inverter 20 drives AC electric motor MG such that the DC voltage is converted to AC voltage by switching operations in response to switching control signals S1 to S6 to provide the torque of 0. Thus, AC electric motor MG is driven to generate 0 or positive torque designated by torque command value Tqcom.

Further, at the time of regenerative braking of hybrid vehicle or electric vehicle having motor drive system 100 mounted thereon, the torque command value Tqcom of AC electric motor MG is set to a negative value (Tqcom<0). In that case, inverter 20 can convert the AC voltage generated by AC electric motor MG to DC voltage by the switching operations in response to switching control signals S1 to S6, and to use the converted DC voltage (system voltage) to charge DC power source 10 through smoothing capacitor C0. The regenerative braking here refers to braking with regeneration through a foot brake operation by a driver of the hybrid vehicle or the electric vehicle, or deceleration (or stopping acceleration) of the vehicle while regenerating power, by releasing the accelerator pedal during running, without operating the foot brake.

Current sensor 24 is formed of a hole sensor or the like, which detects motor current supplied from inverter 20 to AC electric motor MG, and outputs the detected value to controller 30. As the sum of instantaneous values of three-phase currents iu, iv and iw is zero, what is necessary is simply to arrange the current sensor 24 to detect motor currents of two phases only (for example, V-phase current iv and W-phase current iw), as shown in FIG. 1.

Rotation angle sensor (typically a resolver) 25 detects a rotation angle θ of AC electric motor MG and transmits the detected rotation angle θ to controller 30. Based on the rotation angle θ, the number of rotations (rotation speed) of AC electric motor MG is also calculated by controller 30.

Controller 30 controls operation of inverter 20 based on torque command value Tqcom designating an output torque of AC electric motor MG as a load, DC voltage Vdc detected by voltage sensor 13, motor currents iv and iw from current sensor 24, and rotation angle θ from rotation angle sensor 25, such that AC electric motor MG outputs a torque in accordance with the torque command value Tqcom. Typically, the command value of current (motor current) supplied from inverter 20 to AC electric motor MG in correspondence to torque command value Tqcom is determined, and switching control signals S1 to S6 for turning on/off the semiconductor switching elements Q1 to Q6 are generated so that the motor current in accordance with the command value is generated.

Next, power conversion by inverter 20 controlled by controller 30 will be described in detail. Basically, in the motor drive system in accordance with the present embodiment, inverter 20 is controlled by PWM control.

A control structure may be provided in which PWM control and other control method (such as rectangular wave voltage control) are selectively adopted in accordance with the state of operation of AC electric motor MG. In such a control structure also, it is possible to apply the ripple current control in accordance with the present invention as will be described in the following, when PWM control is selected.

Motor control using PWM method will be described in detail with reference to FIG. 2.

Figure 2:
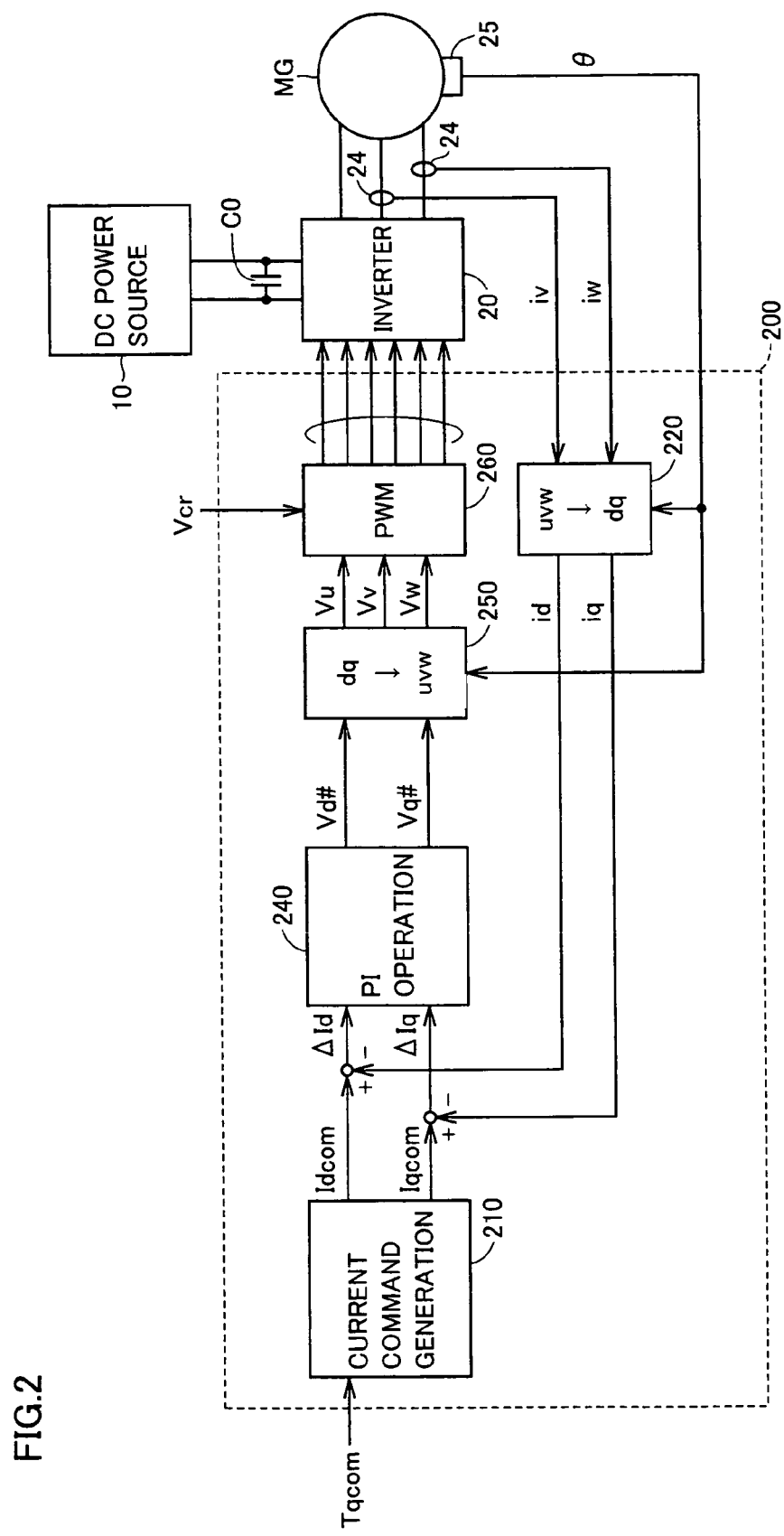
FIG. 2 is a schematic block diagram illustrating a control structure of PWM control.

Referring to FIG. 2, a PWM control block 200 includes a current command generating unit 210, coordinate converting units 220 and 250, a PI operating unit 240, and a PWM signal generating unit 260. The PWM control block 200 represents a functional block realized by executing, in a prescribed period, a program stored in advance in controller 30.

In accordance with a map formed in advance, current command generating unit 210 generates current command values Idcom (d-axis) and Iqcom (q-axis) in accordance with the torque command value Tqcom of AC electric motor MG.

Coordinate converting unit 220 calculates d-axis current id and q-axis current iq, based on motor currents (iv, iw, iu=−(iv+iw)) detected by current sensor 24, through coordinate conversion (three-phases→two phases) using rotation angle θ detected by rotation angle sensor 25 provided on AC electric motor MG.

To PI operating unit 240, a deviation ΔId (ΔId=Idcom−id) of d-axis current from the command value and a deviation ΔIq (ΔIq=Iqcom−iq) of q-axis current from the command value are input. PI operating unit 240 performs PI operation with prescribed gain on each of d-axis current deviation ΔId and q-axis current deviation ΔIq to find control deviation, and generates a d-axis voltage command value Vd# and a q-axis voltage command value Vq# in accordance with the control deviation.

Coordinate converting unit 250 converts the d-axis voltage command value Vd# and the q-axis voltage command value Vq# to voltage command values Vu, Vv and Vw of respective phases of U, V and W, by coordinate conversion (two phases→three phases) using the rotation angle θ of AC electric motor MG.

PWM signal generating unit 260 generates switching control signals S1 to S6 of inverter 20 shown in FIG. 1, based on a comparison between voltage command values Vu, Vv and Vw of respective phases with a prescribed carrier.

As the inverter 20 is switching-controlled by switching control signals S1 to S6 generated by PWM control block 200, a motor current for providing the torque in accordance with torque command value Tqcom is supplied to AC electric motor MG.

Figure 3:
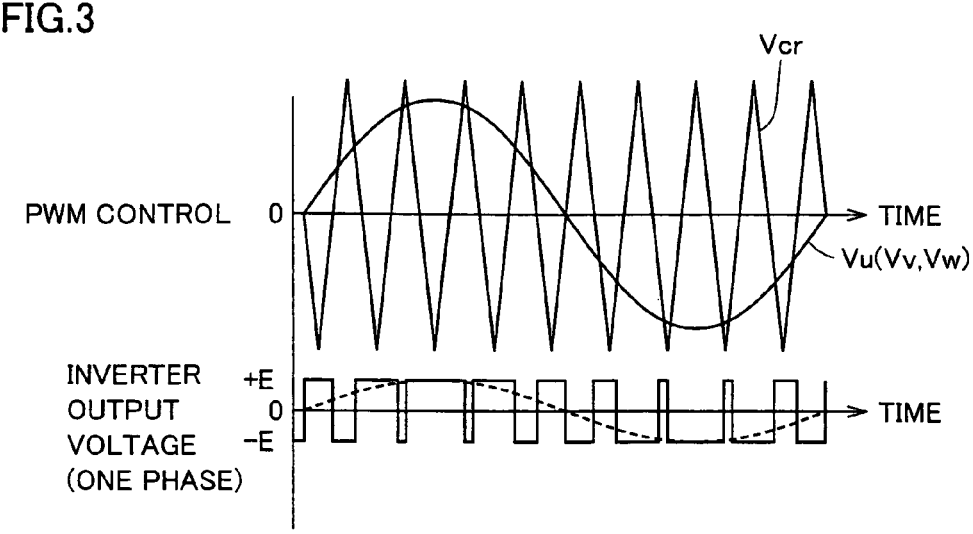
FIG. 3 is a waveform diagram illustrating a control operation of PWM control.

FIG. 3 shows waveforms related to the PWM control operation.

PWM control refers to a control method in which an average output voltage value of every period is changed by changing pulse width of rectangular wave output voltage at every constant period. Generally, the constant period is divided into a plurality of switching periods that correspond to the period of carrier Vcr, and on/off of semiconductor switching elements is controlled in every switching period, whereby the pulse width modulation control mentioned above is realized.

Referring to FIG. 3, in PWM signal generating unit 260 (FIG. 2), signal waves in accordance with voltage command values Vu, Vv and Vw of respective phases from coordinate converting unit 250 (FIG. 2) are compared with a carrier Vcr of a prescribed frequency. In a section where the voltage value of carrier Vcr is higher than the voltage command values Vu, Vv and Vw and in a section where voltage command values Vu, Vv and Vw are higher than the voltage value of carrier Vcr, on/off of upper and lower arm elements are switched in respective phases of the inverter 20, whereby an AC voltage as a set of rectangular wave voltages can be supplied as the inverter output voltage of respective phases, to AC electric motor MG. The fundamental wave component of the AC voltage is indicated by the dotted line in FIG. 3.

Figure 4:
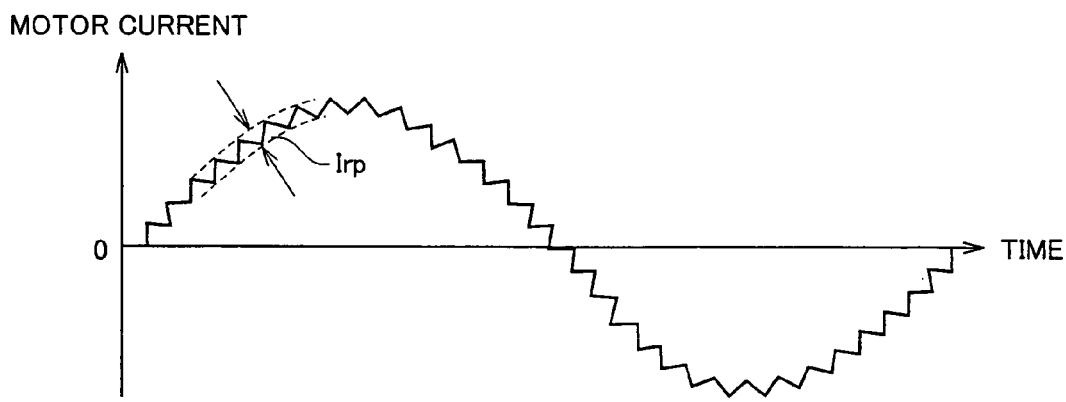
FIG. 4 is an illustration showing a schematic form of motor current.

As shown in FIG. 4, the motor current of each phase of AC electric motor MG is the AC current of a frequency in accordance with the fundamental wave component of AC voltage. Here, the AC current is generated with increase/decrease of motor current being alternately switched at high frequency in accordance with on/off of semiconductor switching elements in correspondence with the carrier frequency. Therefore, current ripple, which is the AC current component corresponding to the carrier frequency generates in the motor current. By way of example, in a three-phase inverter, the frequency of ripple current is six times the switching frequency (carrier frequency).

In the embodiment described below, a peak-to-peak value of ripple current shown in FIG. 4 will be defined as ripple current width Irp. As will be understood from the following description, in the motor drive system in accordance with the embodiment of the present invention, ripple current control is executed to maintain the ripple current width Irp at an appropriate level, by adjusting the width to match a reference value.

(Ripple Current Control)

Figure 5:
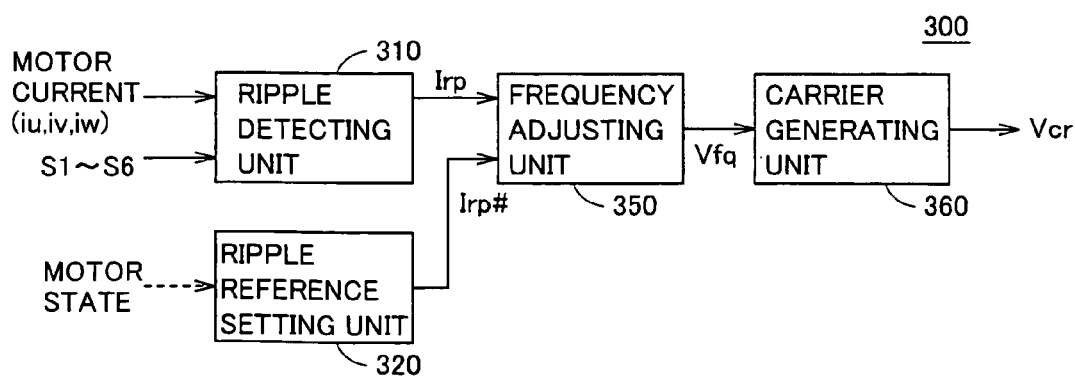
FIG. 5 is a schematic block diagram showing ripple current control in accordance with an embodiment of the present invention.

FIG. 5 is a schematic block diagram illustrating the ripple current control in accordance with an embodiment of the present invention.

Referring to FIG. 5, a ripple current control unit 300 includes a ripple detecting unit 310, a ripple reference setting unit 320, a frequency adjusting unit 350, and a carrier generating unit 360. Each of the blocks constituting ripple current control unit 300 is realized by hardware or software processing by controller 30.

Ripple detecting unit 310 receives the motor current (three-phase currents iu, iv, iw) and switching control signals S1 to S6, and detects the ripple current width Irp of the motor current. The ripple current width Irp is detected based on the motor current detected by current sensor 24.

The method of detecting ripple current width Irp by ripple detecting unit 310 suitable for ripple current control in accordance with the present embodiment will be described in detail later.

Ripple reference setting unit 320 sets a reference value Irp# of ripple current width Irp. If the reference value Irp# is set too small, the number of switchings increases and hence switching loss in inverter 20 increases, and if it is set too large, temperature much increases in AC electric motor MG. Therefore, it must be set to an appropriate level to find a good balance of the trade-off.

As an example, reference value Irp# may be a fixed value with an appropriate margin, in consideration of the temperature increase characteristic of the permanent magnet. Alternatively, the reference value Irp# may be changed on a timely basis in accordance with the motor state. For instance, a temperature sensor, not shown, may be provided on AC electric motor MG, and the reference value Irp# may be changed in accordance with the motor temperature. Specifically, by setting the reference value Irp# relatively low when the motor temperature increases, increase of magnet temperature to a range causing demagnetization can more reliably be prevented.

Further, in consideration of motor output (torque and/or rotation speed), when the output is high and there is a concern of temperature increase, the reference value Irp# may be set to a relatively low value. By changing the reference value Irp# in accordance with the motor state (temperature, torque command value, rotation speed) of AC electric motor MG, control of ripple current width at a more appropriate level becomes possible.

Frequency adjusting unit 350 generates, based on the ripple current width Irp detected by ripple detecting unit 310 and the reference value Irp#, a control signal Vfq for setting the carrier frequency. The control signal Vfq is an analog voltage signal, or a digital signal of multiple bits.

Carrier generating unit 360 sets the frequency of carrier Vcr in accordance with the control signal Vfq set by frequency adjusting unit 350. By way of example, carrier generating unit 360 is implemented by a voltage oscillator (VCO) that generates an oscillation signal having a frequency in accordance with a voltage level of control signal Vfq as an analog voltage signal, or an analog voltage obtained by D/A conversion of control signal Vfq as a digital signal.

Figure 6:
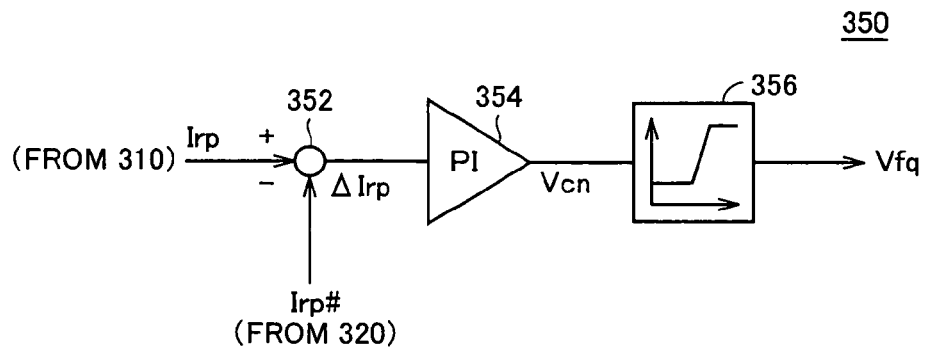
FIG. 6 is a block diagram showing an exemplary configuration of the frequency adjusting unit shown in FIG. 5.

FIG. 6 is a block diagram showing an exemplary configuration of frequency adjusting unit 350.

Referring to FIG. 6, frequency adjusting unit 350 has an addition/subtraction unit 352, a PI operating unit 354, and a limiter 356.

Adding/subtracting unit 352 calculates a deviation $\Delta$Irp ($\Delta$Irp=Irp−Irp#) of the ripple current width Irp detected by ripple detecting unit 310 from the reference value Irp#. PI operating unit 354 performs a prescribed control operation (typically, PI control operation) on the deviation $\Delta$Irp obtained from adding/subtracting unit 352, to generate the control voltage Vcn. The control voltage Vcn indicates a carrier frequency to attain $\Delta$Irp→0, set by the PI control.

Control voltage Vcn is passed through limiter 356 and converted to control signal Vfq. In limiter 356, whether the control voltage Vcn is within a preset voltage range (lower limit Vmin to upper limit Vmax) or not is checked. If Vcn<Vmin, Vfq is set to Vpf=Vmin, and if Vcn>Vmax, Vfq is set to Vfq=Vmax. If Vmin≦Vcn≦Vmax, Vfq is set to Vfq=Vcn.

The lower limit Vmin and the upper limit Vmax are determined in correspondence with the upper and lower limit frequencies of the carrier frequency (that is, switching frequency). The upper and lower limit frequencies are set in consideration of a frequency range in which noise generates upon switching (for example, audible frequency range), the frequency necessary to ensure accuracy of current control to be determined in accordance with the rotation speed of AC electric motor MG, or the frequency that allows switching from a hardware standpoint.

By such a control process, ripple current control can be executed, by which the ripple current width in the motor current under PWM control is maintained at an appropriate level (reference value Irp#).

Figure 7:
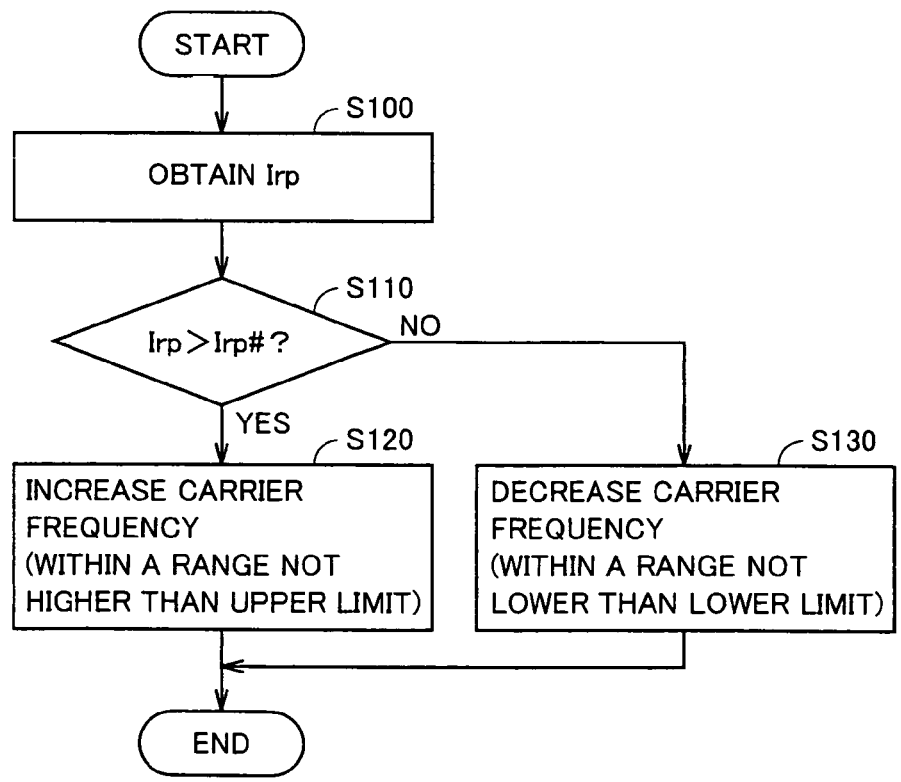
FIG. 7 is a flowchart for executing the ripple current control in accordance with the present embodiment.

In place of ripple current control unit 300 shown in FIG. 5, a control process in accordance with the flowchart shown in FIG. 7 may be executed using a program stored beforehand in controller 30, to realize similar ripple current control.

Referring to FIG. 7, at step S100, controller 30 obtains the ripple current width Irp, and at step S110, determines whether or not the ripple current width Irp is larger than the reference value Irp#.

If ripple current width Irp is larger than the reference value Irp# (Irp>Irp#, YES at S110), controller 30 lowers the carrier frequency than the present value, at step S120. Here, decrease of carrier frequency is limited to a range in which the carrier frequency does not go down below a preset lower limit frequency, as in the process by limiter 356 described above.

If ripple current width Irp is equal to or smaller than the reference value Irp# (Irp≦Irp#, NO at S110), controller 30 increases the carrier frequency from the present value, at step S130. Here, increase of carrier frequency is limited to a range in which the carrier frequency does not exceed a preset upper limit frequency, as in the process by limiter 356 described above. Though not shown, if the difference between the ripple current width Irp and the reference value Irp# is small, a dead band may be provided, in which the present carrier frequency is maintained.

By such a control process also, the ripple current control can be executed, for maintaining the ripple current width in the motor current at an appropriate level (reference value Irp#).

By the motor drive system in accordance with the present embodiment, the ripple current control is executed, by which the ripple current width in the motor current under PWM control is maintained at an appropriate level and, therefore, it is possible to prevent increase of switching loss in the power converter (inverter) resulting from too much curbing of ripple current, and to prevent generation of demagnetization caused by magnet temperature increase in the AC electric motor resulting from excessively high ripple current.

As a result, in a hybrid vehicle or an electric vehicle in which the vehicle driving power is generated by the motor drive system in accordance with the present embodiment, it is possible to prevent degradation of vehicle running performance caused by occurrence of demagnetization in the electric motor and to improve mileage by reducing power loss in the power converter (inverter) under PWM control.

(Modification of Ripple Current Control)

Next, a modification of the present embodiment related to setting of the reference value of ripple current width will be described.

Figure 8:
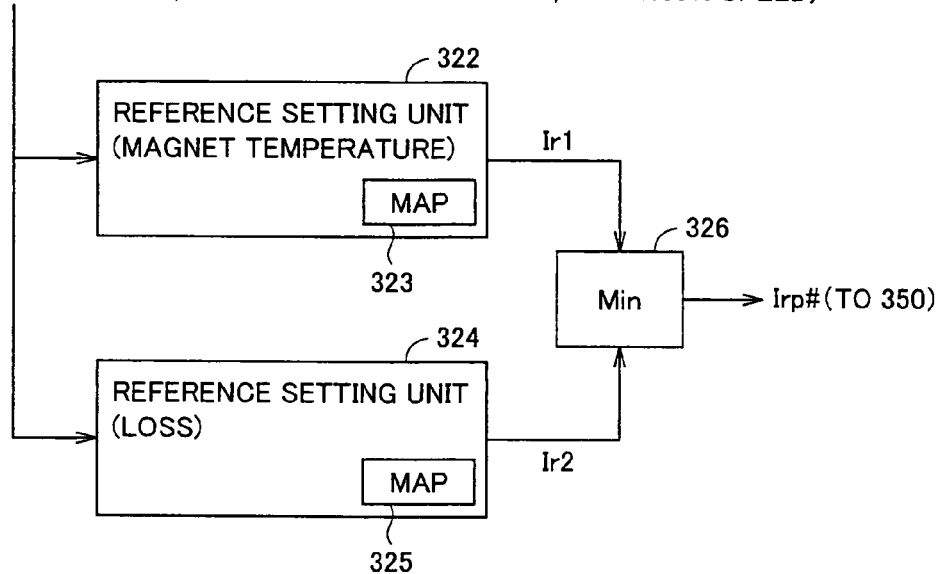
FIG. 8 is a block diagram showing a configuration of a ripple reference setting unit in accordance with a modification of an embodiment.

FIG. 8 is a block diagram showing an exemplary configuration of a ripple reference setting unit 320# in accordance with a modification of the embodiment. The ripple reference setting unit shown in FIG. 8 may be used in place of ripple reference setting unit 320 shown in FIG. 5. Specifically, the modification is the same as the embodiment described above except for the setting of reference value of the ripple current width and, therefore, description thereof will not be repeated.

Referring to FIG. 8, ripple reference setting unit 320# includes reference setting units 322 and 324 and a minimum value setting unit 326.

Reference setting unit 322 has a map 323 representing a temperature increase characteristic of permanent magnet 28 with respect to the ripple current width, found beforehand, for example, by experiments. Reference setting unit 322 sets a reference value Ir1 of ripple current width Irp, based on the temperature increase characteristic.

As described above, reference value Ir1 may be variably set based on the motor state (particularly, motor temperature). In that case, considering temperature difference from the temperature upper limit not causing demagnetization, a map for setting the reference value Ir1 with respect to present motor temperature may be formed beforehand and stored in map 323. Alternatively, a map may be possible in which reference value Ir1 is changed depending on the motor output (torque command value, rotation speed or the like). Specifically, reference setting unit 322 corresponds to ripple reference setting unit 320 shown in FIG. 5.

Reference setting unit 324 has a map 325 for setting a reference value Ir2 in accordance with a power loss characteristic of the motor system as a whole with respect to the ripple current width. As described above, when the carrier frequency is lowered and the ripple current width increases as a result, power loss outside inverter 20 increases, including the copper loss/iron loss in AC electric motor MG. Further, power loss changes depending on the motor state (motor temperature, torque command value, rotation speed).

Map 325 stores relations between the motor state (motor temperature, torque command value, rotation speed) and the upper limit of ripple current width viewed from the loss of motor drive system as a whole, determined beforehand in accordance with the power loss characteristic mentioned above. Reference setting unit 324 sets reference value Ir2 making a reference to map 325 using the present motor state.

Minimum value setting unit 326 sets smaller one of reference values Ir1 and Ir2 set by reference setting units 322 and 324, as the reference value Irp# of ripple current width.

By such an approach, it becomes possible to set the appropriate level of ripple current width Irp, that is, the reference value Irp#, in consideration of overall system loss including the motor loss and the magnet temperature increase.

Figure 9:
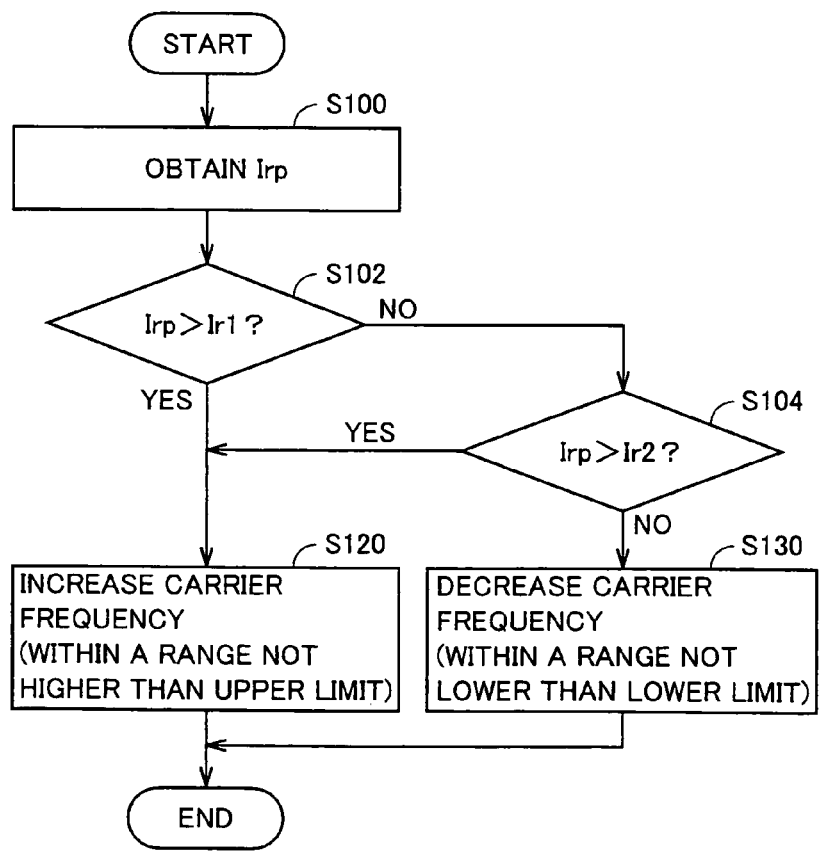
FIG. 9 is a flowchart for executing the ripple current control in accordance with the modification of the embodiment.

Alternatively, by executing the control process in accordance with the flowchart shown in FIG. 9 by a program stored in advance in controller 30, the ripple current control in accordance with the modification can be realized.

Referring to FIG. 9, controller 30 obtains, at step S100, the ripple current width Irp. At step 102, the obtained ripple current width Irp is compared with a reference value Ir1 set in consideration of magnet temperature, similar to that shown in FIG. 8.

If the ripple current width Irp is larger than the reference value Ir1 (Irp>Ir1, YES at step S102), controller 30 executes step S120, as in FIG. 7. Thus, the carrier frequency is made lower than the present value within a range not lower than the lower limit frequency.

In contrast, if the ripple current width Irp is equal to or smaller than the reference value Ir1 (Irp≦Ir1, NO at step S102), controller 30 further compares at step 104 the ripple current width Irp with reference value Ir2 that has been set in consideration of power loss.

If the ripple current width Irp is larger than the reference value Ir2 (Irp>Ir2, YES at S104), controller 30 executes step S120. Thus, if it is necessary to reduce the ripple current width from the viewpoint of either magnet temperature or power loss, it is possible to reduce the ripple current width by lowering carrier frequency.

On the contrary, if the ripple current width Irp is equal to or smaller than reference value Ir2 (Irp≦Ir2, NO at S104), controller 30 executes step S130 as in FIG. 7. Thus, the carrier frequency is increased from the present value in a range not exceeding the upper limit frequency. Therefore, if increase of ripple current width is tolerable both from the viewpoints of magnet temperature and power loss, the carrier frequency is lowered to reduce switching loss in inverter 20. This is equivalent to the increase of ripple current width to an appropriate level for curbing switching loss, based on the determination that the ripple current width is too small.

In this manner also, it is possible to perform ripple current control in accordance with the modification of the present embodiment, in which the appropriate level of ripple current width Irp is set in consideration of the overall system loss including motor loss and the magnet temperature increase. In the flowchart shown in FIG. 9, a dead band may be provided in which the present carrier frequency is maintained, if the difference between ripple current width and the reference values Ir1 and Ir2 is small.

(Detection of Ripple Current Width)

Figure 10:
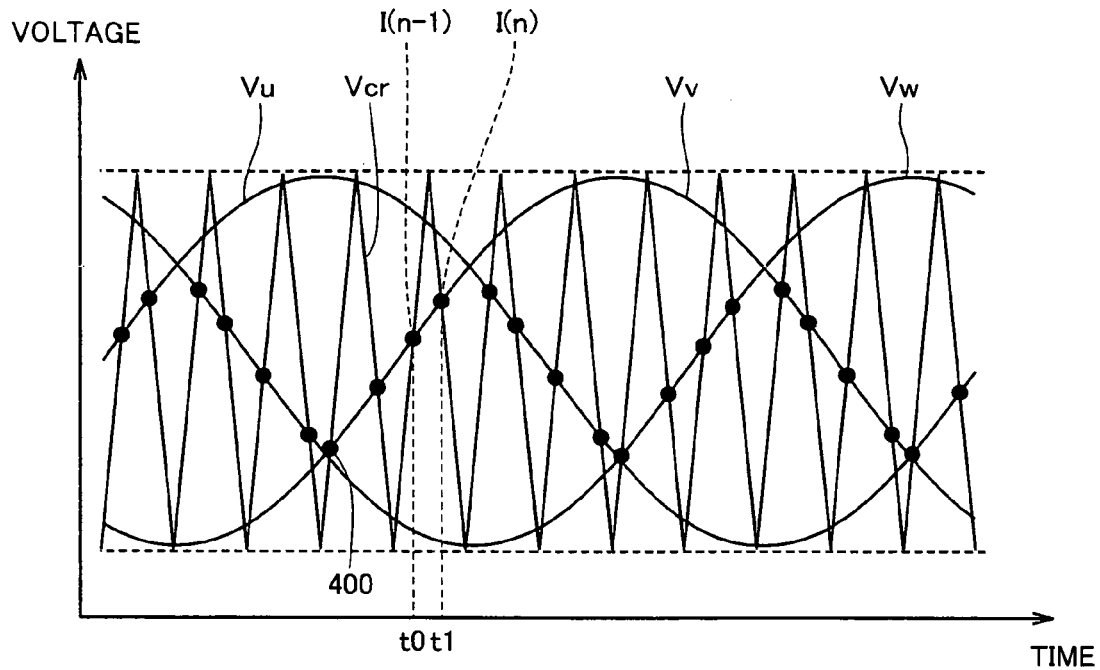
FIG. 10 is a first waveform diagram illustrating a method of detecting ripple current width in the motor drive system in accordance with an embodiment of the present invention and its modification.
Figure 11:
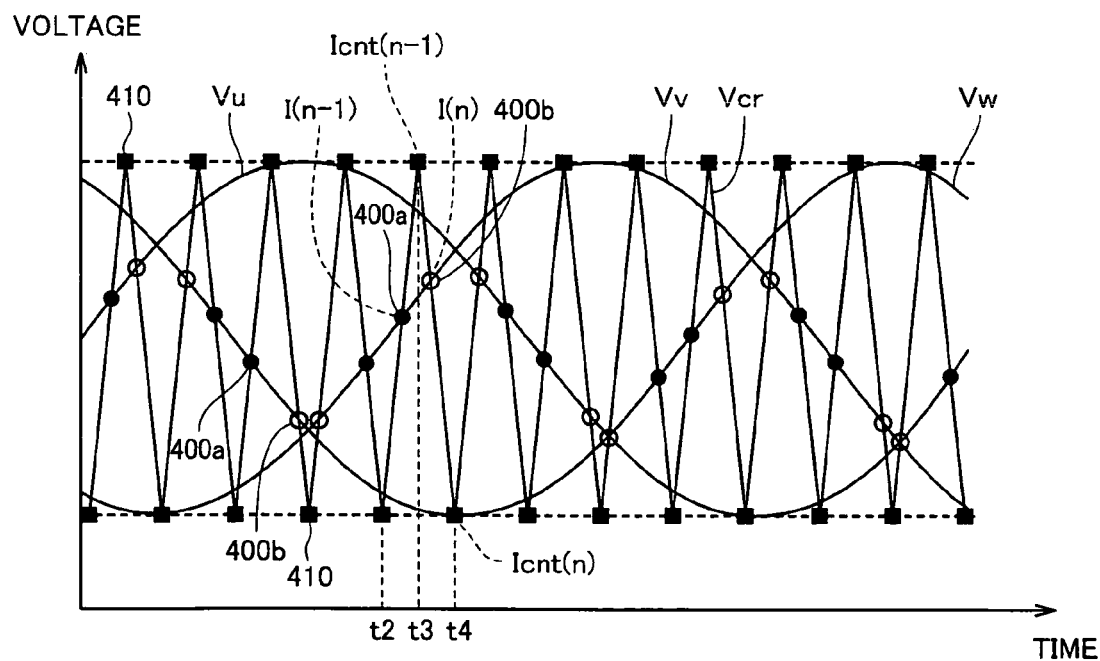
FIG. 11 is a second waveform diagram illustrating a method of detecting ripple current width in the motor drive system in accordance with an embodiment of the present invention and its modification.

Next, a preferred method of detecting ripple current width, that is, the operation of ripple detecting unit 310, in the embodiment of the present invention and its modification will be described. FIGS. 10 and 11 show first and second detection methods, respectively.

Referring to FIG. 10, in PWM control, at an intersecting point of voltage command of each phase (Vu, Vv, Vw) and the carrier Vcr, on/off of the semiconductor switching elements of each phase is switched. As described above, considering that the direction of change of the motor current (up/down) is reversed as the on/off of the semiconductor switching element is switched in each phase, it is possible to detect the ripple current based on the current value at the on/off switching timing of semiconductor switching.

Therefore, in the first detection method shown in FIG. 10, in each period of carrier Vcr, current sampling points 400 are set in correspondence with two intersections between carrier Vcr and the voltage command (Vu, Vv, Vw) of any phase. Based on a difference between detected values of current sensor 24 at these current sampling points 400, the ripple current width Irp is detected.

In the example shown in FIG. 10, at time point t0, current I(n−1) is sampled, and at time point t1, current I(n) is sampled. I(n−1) and I(n) correspond to the detected values of motor current (measured values of current sensor 24) of V-phase, at time points t0 and t1. Then, ripple current width Irp is represented by Equation (1) below $$Irp = |I(n) - I(n-1)| \tag{1}$$

As the ripple current width is detected in this manner, it becomes unnecessary to conduct a frequency processing such as passing the motor current of each phase through a band-pass filter to extract the ripple current component only, to detect the ripple current width. As a result, the ripple current width can be detected in a simple manner without any control delay caused by filtering. As a result, control speed of ripple current control in accordance with the present embodiment can be improved.

FIG. 11 shows a second method of detecting the ripple current width.

Referring to FIG. 11, it is also necessary to sample detected value of current sensor 24 for the original motor current control shown in FIG. 2. Here, it is assumed that a current sampling point 410 for the motor current control is provided in correspondence with a timing when the voltage of carrier Vcr attains to the upper limit or lower limit, that is, in correspondence with half-period of the carrier Vcr. Specifically, using the current value of each phase based on the detected value of current sensor 24, the motor current control shown in FIG. 2 is executed.

In the second detection method shown in FIG. 11, by utilizing the sampling point 410, the number of current samplings for detecting the ripple current width can be reduced as compared with the first detection method shown in FIG. 10. Specifically, the current sampling point is provided on only one of the two intersections between the carrier Vcr and the voltage command value of any phase, in each period of carrier Vcr.

In the example shown in FIG. 11, at time points t2, t3 and t4, current sampling points 410 are provided for the motor current control. At time point t3, current Icnt(n−1) is sampled, and at time point t4, current Icnt(n) is sampled.

Further, one of current sampling candidate points 400a and 400b corresponding to two intersections between the voltage command (Vu, Vv, Vw) and the carrier Vcr existing between two current sampling points 410 is set as a current sampling point 400.

By way of example, when we represent the current value at current sampling candidate point 400a preceding time point t3 as I(n−1), the ripple current width Irp can be set in accordance with Equation (2) below.

$$Irp = |Icnt(n-1) - I(n-1)| \cdot 2 \qquad (2)$$

Further, when we represent the current value at current sampling candidate point 400b between time points t3 and t4 as I(n), the ripple current width Irp can be set in accordance with Equation (3) below.

$$Irp = |(Icnt(n) - I(n)| \cdot 2 \qquad (3)$$

As to which of the current sampling candidate points 400a and 400b is to be adopted, from the viewpoint of control safety (to prevent increase of magnet temperature), it is preferred to adopt one that has longer time difference from current sampling point 410, as the current sampling point 400.

By such an approach, by simply adding one current sampling point 400 per one period of carrier Vcr to the current sampling point 410 that is originally provided for current control, detection of ripple current width becomes possible. Specifically, in addition to the effect attained by the detection method shown in FIG. 10, there is another effect that the number of current sampling points 400 added for ripple current control can be reduced. Thus, control load on controller 30 in relation to ripple current control can be alleviated.

Though a PWM-controlled three-phase inverter has been described as an example of a power converter and a permanent magnet type three-phase synchronous electric motor has been described as an AC electric motor, application of the present invention is not limited to the above. For confirmation, it is specifically described that the present invention is applicable to a motor drive system including a combination of power converter and AC electric motor of different types.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

The invention claimed is:

1. A motor drive system, comprising
   an AC electric motor having a rotor with a permanent magnet attached thereon;
   a power converter for controlling power supply to said AC electric motor by on/off control of a plurality of power semiconductor switching elements under pulse width modulation control;
   a current detector for detecting a motor current flowing between said power converter and said AC electric motor;
   a ripple detecting unit for detecting a ripple current width of said motor current, corresponding to switching frequency of each of said power semiconductor switching elements, based on a detected value from said current detector;
   a reference setting unit for setting a reference value of said ripple current width such that magnet temperature does not increase to a temperature causing demagnetization of said permanent magnet, at least based on a temperature increase characteristic of said permanent magnet with respect to said ripple current width; and
   a frequency adjusting unit for controlling frequency of a carrier used for said pulse width modulation control, based on a comparison between said ripple current width detected by said ripple detecting unit and said reference value set by said reference setting unit,
   said frequency adjusting unit increasing frequency of said carrier to be higher than present frequency when said ripple current width is larger than said reference value and decreasing the frequency of said carrier to be lower than the present frequency when said ripple current width is equal to or smaller than said reference value.

2. The motor drive system according to claim 1, wherein said reference setting unit sets said reference value, further based on power loss characteristic of said motor drive system as a whole, with respect to said ripple current width.

3. The motor drive system according to claim 1, wherein said reference setting unit changes said reference value in accordance with a state of said AC electric motor.

4. The motor drive system according to claim 1, wherein said frequency adjusting unit includes
   a deviation calculating unit for calculating a deviation of said ripple current width from said reference value, and
   a control operation unit for controlling the frequency of said carrier in accordance with a control operation value using the calculated deviation.

5. The motor drive system according to claim 1, further comprising
   a current control unit generating a voltage command value of sinusoidal wave for controlling said motor current such that the motor current matches a current command value, based on the detected value from said current detector; wherein
   on/off of said plurality of power semiconductor switching elements is controlled based on a comparison between said voltage command value and a voltage value of said carrier; and
   said ripple detecting unit detects said ripple current width based on a difference between detected values from said current detector sampled respectively at two timings at which said voltage command value and said carrier intersect, in one period of said carrier.

6. The motor drive system according to claim 1, further comprising
   a current control unit sampling the detected value from said current detector at every half period of said carrier and generating a voltage command value of sinusoidal wave for controlling said motor current such that the motor current matches a current command value, based on the sampled current value; wherein
   on/off of said plurality of power semiconductor switching elements is controlled based on a comparison between said voltage command value and a voltage value of said carrier; and
   said ripple detecting unit detects said ripple current width based on a difference between detected values from said current detector sampled at one of timings at which said voltage command value and said carrier intersect, in one period of said carrier, and a detected value of said current detector sampled by said current control unit.

7. The motor drive system according to claim 1, wherein said motor drive system is mounted on a vehicle; and
said AC electric motor is a three-phase synchronous motor adapted to generate driving power of said vehicle.

8. The motor drive system according to claim 3, wherein said reference setting unit changes said reference value in accordance with a temperature of said AC electric motor.

9. The motor drive system according to claim 3, wherein said reference setting unit changes said reference value in accordance with an output of said AC electric motor.

* * * * *